(12) United States Patent
Nakaishi

(10) Patent No.: US 6,810,212 B1
(45) Date of Patent: Oct. 26, 2004

(54) OPTICAL NETWORK TERMINATION SYSTEM, APPARATUS, AND OPTICAL NETWORK TERMINATION METHOD

(75) Inventor: Hiroshi Nakaishi, Tokyo (JP)

(73) Assignee: NEC Corporation, Tokyo (JP)

( * ) Notice: Subject to any disclaimer, the term of this patent is extended or adjusted under 35 U.S.C. 154(b) by 513 days.

(21) Appl. No.: 09/707,970

(22) Filed: Nov. 8, 2000

(30) Foreign Application Priority Data

Nov. 10, 1999 (JP) ............................................ 11-319691

(51) Int. Cl.[7] .......................................... G06F 15/173
(52) U.S. Cl. ...................................................... 398/58
(58) Field of Search ........................... 398/58; 709/223, 709/224, 225, 226, 229, 231, 232; 365/200, 185

(56) References Cited

U.S. PATENT DOCUMENTS

| | | | | |
|---|---|---|---|---|
| 5,675,390 A | * | 10/1997 | Schindler et al. ........... | 345/717 |
| 6,141,267 A | * | 10/2000 | Kirihata et al. ............. | 365/200 |
| 6,378,000 B1 | * | 4/2002 | Akatsu et al. .............. | 709/245 |
| 6,480,499 B1 | * | 11/2002 | Richards et al. ............ | 370/412 |
| 6,523,064 B1 | * | 2/2003 | Akatsu et al. .............. | 709/226 |
| 6,552,832 B1 | * | 4/2003 | Beierle et al. .............. | 370/478 |

* cited by examiner

*Primary Examiner*—Leslie Pascal
*Assistant Examiner*—David C. Payne
(74) *Attorney, Agent, or Firm*—Young & Thompson

(57) ABSTRACT

The present invention provide an optical network termination apparatus and method which connects a user network to an optical access network for monitor control from a user network and performs a part of functions of a user terminal such as a personal computer connected to a user network, thereby monitor control on the apparatus from the user network can be realized. The apparatus has a connection unit for connection with the user network. An address of the user network is set in the connection unit, and information from the user network is inputted, and transmitted to the user network, in accordance with the address.

6 Claims, 6 Drawing Sheets

OPTICAL NETWORK TERMINATION SYSTEM, APPARATUS, AND OPTICAL NETWORK TERMINATION METHOD

BACKGROUND OF THE INVENTION

1. Field of the Invention

The present invention relates to an optical access system and apparatus and method, and more particularly, to a technique for connecting an optical access network to a user network.

2. Description of Related Art

First, a conventional optical network termination apparatus (ONT) inserted between an optical access network and a user terminal for termination of optical line, will be described with reference to FIG. 4. FIG. 4 is a block diagram showing an optical access system including the conventional optical network termination apparatus.

As shown in FIG. 4, a conventional optical network termination apparatus 1 is connected to an optical access network 200. When a user terminal 50 performs communication with another user terminal connected to the optical access network 200 or another node, the apparatus realizes information transmission/reception by termination of optical line.

For example, the ITU-T recommends "High Speed Optical Access Systems Based on Passive Optical Network (PON) Techniques" of functions of ATM optical network termination apparatus.

In the conventional optical access system, the optical network termination apparatus 1 is connected to the optical access network 200, but is not connected to a user network 100. In this construction, the user terminal 50 accesses a node A or B in the user network 100 independently of the optical network termination apparatus 1.

That is, as the optical access network 200 and the user network 100 are isolated from each other, it is impossible to, e.g., provide a node to monitor-control the optical network termination apparatus, in the node A or B in the user network 100.

Further, it is also impossible to transfer information from the optical access network 200 to the user network 100 and transfer a response to the information from the user network 100 to the optical access network 200.

As described above, in the conventional optical-network termination apparatus 1, it is impossible to connect the optical access network 200 to the user network 100, and it is difficult to transmit/receive information between these two networks.

Further, as the optical network termination apparatus 1 is usually provided in a user's house, if a part of functions of the user terminal 50 connected to the user network 100 can be performed by the optical network termination apparatus 1, the efficiency of use of the optical network termination apparatus 1 can be improved. However, as the conventional optical network termination apparatus 1 is not connected to the user network 100, the optical network termination apparatus cannot perform the part of functions of the user terminal 50.

SUMMARY OF THE INVENTION

The present invention has been made in consideration of the above situation, and has its object to provide an optical network termination apparatus which connects a user network to an optical access network. Further, another object of the present invention is to provide an optical network termination apparatus for monitor control from a user network. Further, another object of the present invention is to provide an optical network termination apparatus which performs a part of functions of a user terminal such as a personal computer connected to a user network.

According to the present invention, an optical network termination apparatus has a function for connection with a user network, thereby connects an optical access network to the user network. By this arrangement, overlapping services in the optical access network and the user network can be provided. Further, a part of functions of the optical network termination apparatus can be utilized as a part of functions of the user terminal.

The present invention provides an optical network termination apparatus, which is provided between an optical access network and a user terminal and which has means for terminating an optical line, comprising: connection means for connection with a user network to which the user terminal is connected; wherein the connection means includes means for inputting, in accordance with a set address, information having the address from the user network, and means for transmitting the information having the address to the user network.

It is preferable that the optical network termination apparatus further comprising address setting means for setting the address, and the address setting means includes means for setting an address in the connection means in accordance with address information written in an external storage medium.

In the optical network termination apparatus, a CPU to control the connection means may be provided in addition to a CPU to control the overall optical network termination apparatus. Further, in the optical network termination apparatus, a memory for the CPU to control the connection means may be provided in addition to a memory for the CPU to control the overall optical network termination apparatus.

Further, more particularly, the present invention provides an optical network termination apparatus having: a transmission/reception circuit connected to a user terminal and an optical access network; a first reception buffer connected to output of the transmission/reception circuit; a CPU communication format converter which inputs output from the first reception buffer and converts a format of the output and outputs the output to the CPU bus; a RAM, a ROM, a CPU and a main signal communication format converter, connected to the CPU bus; a transmission buffer in which output from the main signal communication format converter is inputted; a main signal insertion circuit which inputs output from the transmission buffer and/or a main signal from the optical access network and a main signal from inside the apparatus itself, and outputs them to the transmission/reception circuit; and a second reception buffer in which output from the main signal insertion circuit is inputted and from which the output is outputted to the CPU communication format converter.

In this construction, the transmission/reception circuit includes connection means for connection with a user network, and wherein the connection means includes: means for inputting, in accordance with a set address set in the CPU communication format converter and the main signal communication format converter, information having the address from the user network, and means for transmitting the information having the address to the user network.

It is preferable that in the optical network termination apparatus, an external storage medium R/W device in which the address is set is provided, and wherein the external storage medium R/W device includes means for setting an address in the CPU communication format converter and the main signal communication format converter in accordance with address information written in an external storage medium.

Other features and advantages of the present invention will be apparent from the following description taken in conjunction with the accompanying drawings, in which like reference characters designate the same name or similar parts throughout the Figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
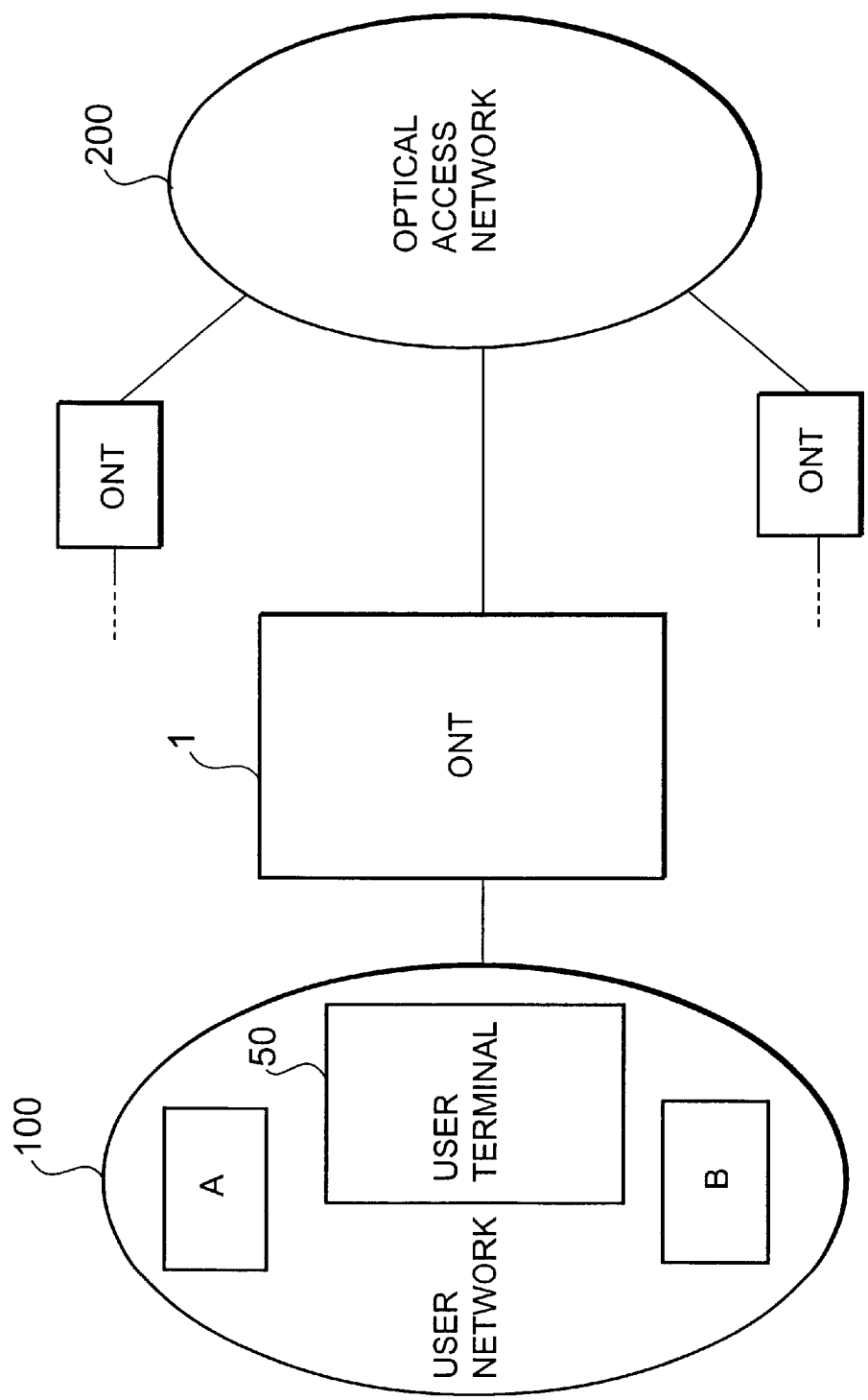
FIG. 1 a block diagram showing the entire construction of an optical access system according to a first embodiment of the present invention.
Figure 2:
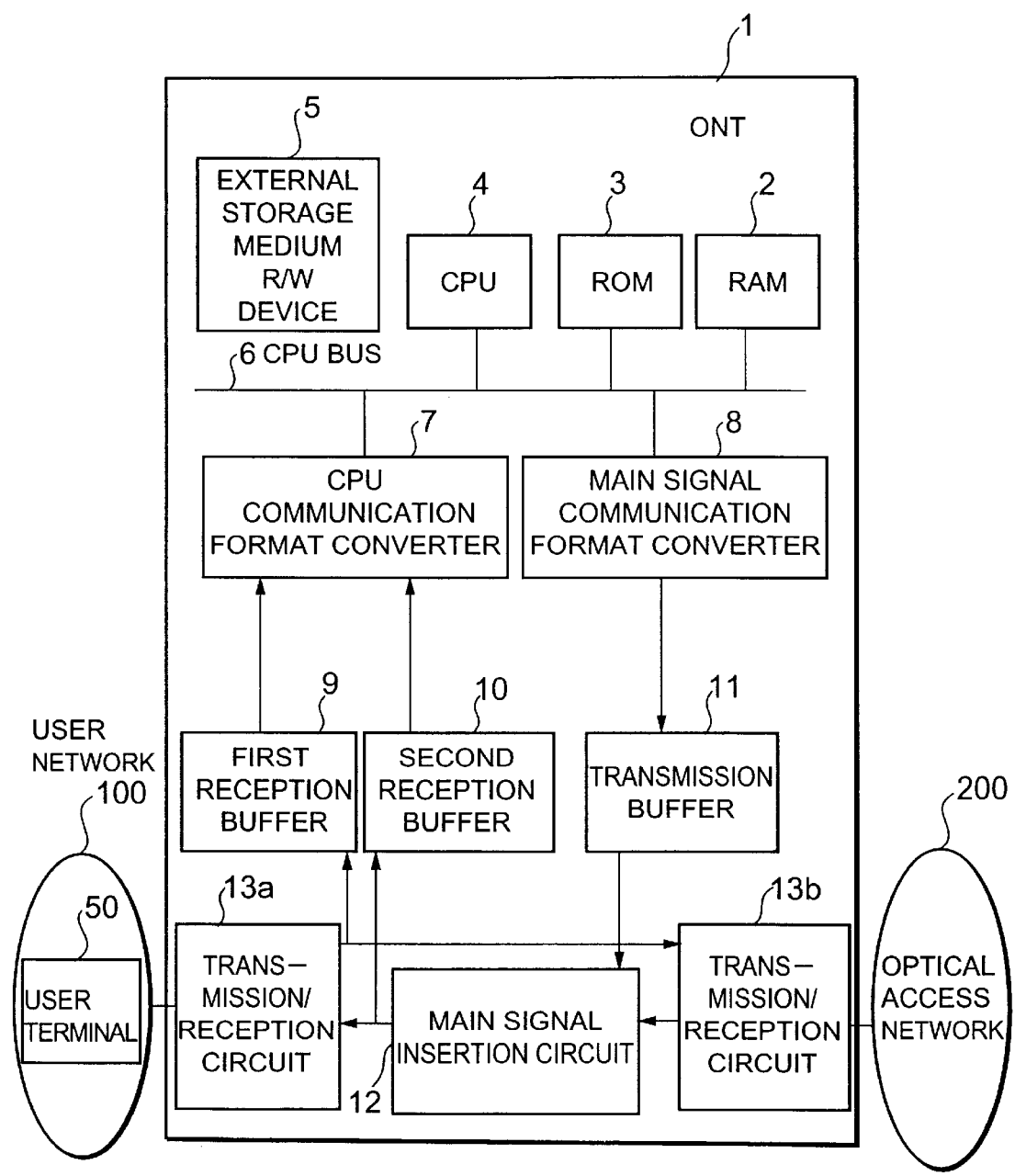
FIG. 2 is a block diagram showing principal elements of an optical network termination apparatus according to the first embodiment.

An optical network termination apparatus according to a first embodiment of the present invention will be described with reference to FIGS. 1 and 2. FIG. 1 is a block diagram showing the entire construction of an optical access system according to the first embodiment of the present invention. FIG. 2 is a block diagram showing principal elements of the optical network termination apparatus according to the first embodiment.

As shown in FIGS. 1 and 2, an optical network termination apparatus 1 is provided between an optical access network 200 and a user terminal 50, for termination of optical line. The optical access network is realized with ATM-PON, N-PON, or SDH network, etc., and user network is realized with IP network for example. The optical network termination apparatus 1 has a transmission/reception circuit 13a, 13b as connection means for connection with a user network 100 to which the user terminal 50 is connected, a first reception buffer 9, a second reception buffer 10, a CPU communication format converter 7, a CPU 4, a ROM 3, a RAM 2, a main signal communication format converter 8, a transmission buffer 11 and a main signal insertion circuit 12. The transmission/reception circuit 13a, 13b and the main signal insertion circuit 12 operate in accordance with an address set in the CPU communication format converter 7 and the main signal communication format converter 8, to input information having the address from the user network 100, and transmit the information having the address to the user network 100.

Further, an external storage medium R/W device 5 as means for setting the address is provided. The external storage medium R/W device 5 sets an address in the CPU communication format converter 7 and the main signal communication format converter 8 in accordance with address information written in an external storage medium such as a CD-ROM or a floppy disk. The external storage medium may be removable from the optical network termination apparatus.

More specifically, in the optical network termination apparatus 1, the transmission/reception circuit 13a, 13b is connected to the optical access network 200, the user terminal 50 and the user network 100. The first reception buffer 9 is connected to the output from the transmission/reception circuit 13a, 13b. The CPU communication format converter 7 inputs and converts the output from the first reception buffer 9, and outputs the converted output to the CPU bus 6. The RAM 2, the ROM 3, the CPU 4, the external storage medium R/W device 5, the CPU communication format converter 7 and the main signal communication format converter 8 are connected to the CPU 6. The output from the main signal communication format converter 8 is inputted into the transmission buffer 11. The main signal insertion circuit 12 inputs the output from the transmission buffer 11 and/or a main signal from the optical access network 200 and a main signal from the inside the apparatus, and outputs them to the transmission/reception circuit 13a, 13b. The output from the main signal insertion circuit 12 is inputted into the second reception buffer 10 and outputted from the second reception buffer 10 to the CPU communication format converter 7.

Next, the operation of the optical network termination apparatus according to the first embodiment will be described. The circuit having the above connection means is an agent circuit to connect the optical network termination apparatus to the user network 100. In the optical network termination apparatus 1 having the agent circuit, it is necessary to set an address of a signal, transmitted/received to/from the user network 100, from the external storage medium R/W device 5 in advance. The CPU 4 sets the address information in the CPU communication format converter 7 and the main signal communication format converter 8 connected to the CPU bus 6.

Thereafter, a main signal having the address from the user network 100 is inputted into the CPU 4, and the main signal having the address is transmitted to the user network 100.

Further, if an address of main signal to be received from the optical access network 200 is set from the external storage medium R/W device 5 in advance, a main signal having the address from the optical access network 200 is inputted into the CPU 4, and the main signal having the address is transmitted to the optical access network 200.

Accordingly, as the optical network termination apparatus 1 can transmit/receive information to/from the user network 100, it is possible to, e.g., perform monitor control on the optical network termination apparatus 1 from a node A or B of the user network 100. Further, software installation can be performed from the user network 100 under the control of the user network 100. Thus, a part of functions of the user terminal 50 can be performed by the optical network termination apparatus 1.

Further, as information from the optical access network 200 can be stored, overlapping services in different two networks, e.g., to respond to an inquiry from the user network 100 about information from the optical access network 200, can be provided.

Figure 5:
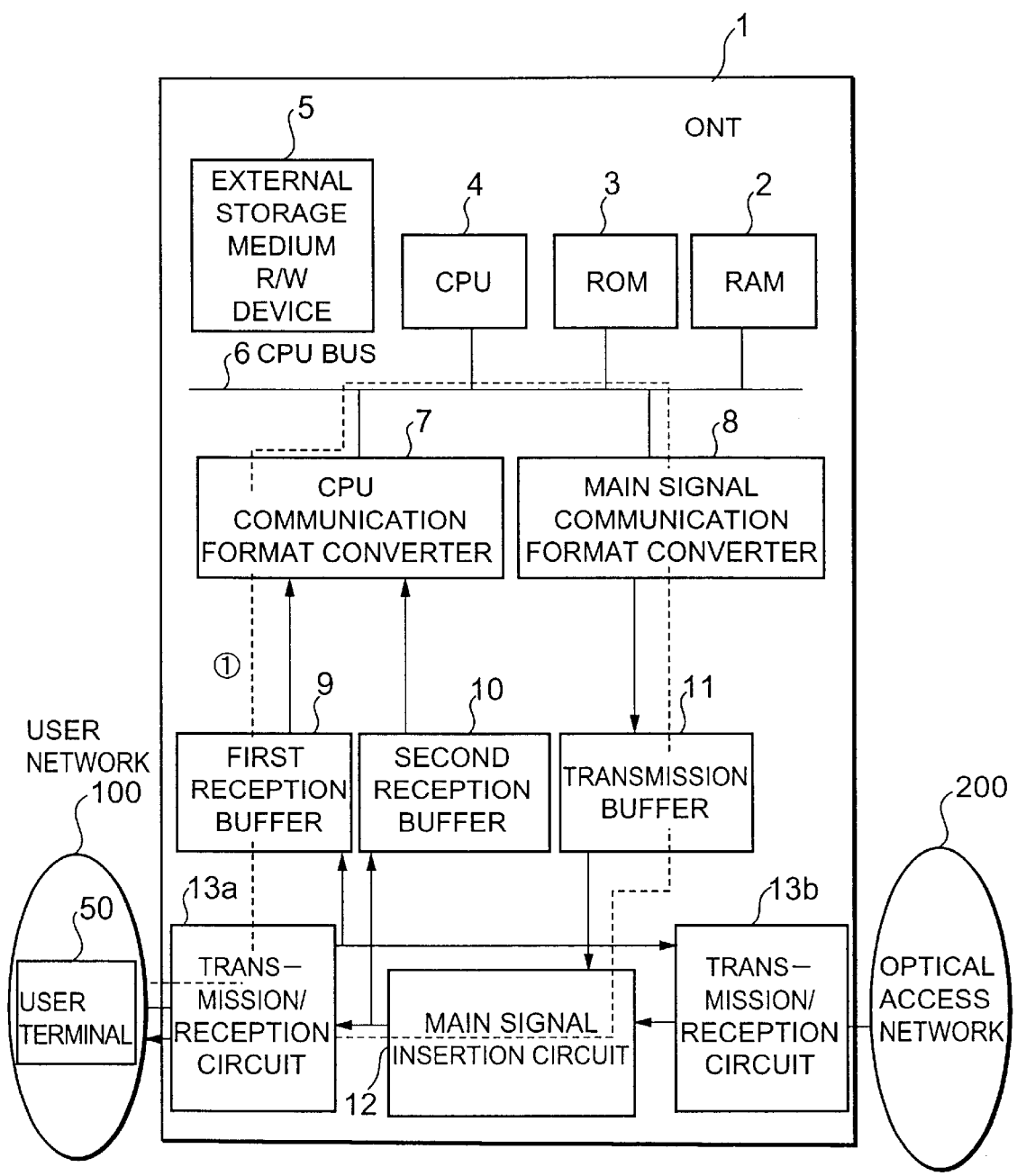
FIG. 5 is a block diagram showing a signal flow sent from user network.

A sample signal flow is shown in FIG.5 with dotted line. The signal from the user network is received at transmission/reception circuit 13a at first, then sent to the first reception buffer 9, and to the CPU communication format converter 7. The CPU communication format converter 7 convert the signal data from the first reception buffer 9 to the CPU communication format in accordance with address information written in an external storage medium, and outputs it to the CPU bus 6.

The main signal communication format converter 8 receive the converted signal data from the CPU bus 6 and convert it to the main signal communication format, and output it to transmission buffer 11.

The signal data converted to the main signal communication format is transmitted to main signal insertion circuit 12, and sent to the transmission/reception circuit 13a to output to the user network. This sample signal flow is used for monitor or control ONT from a user network.

Figure 6:
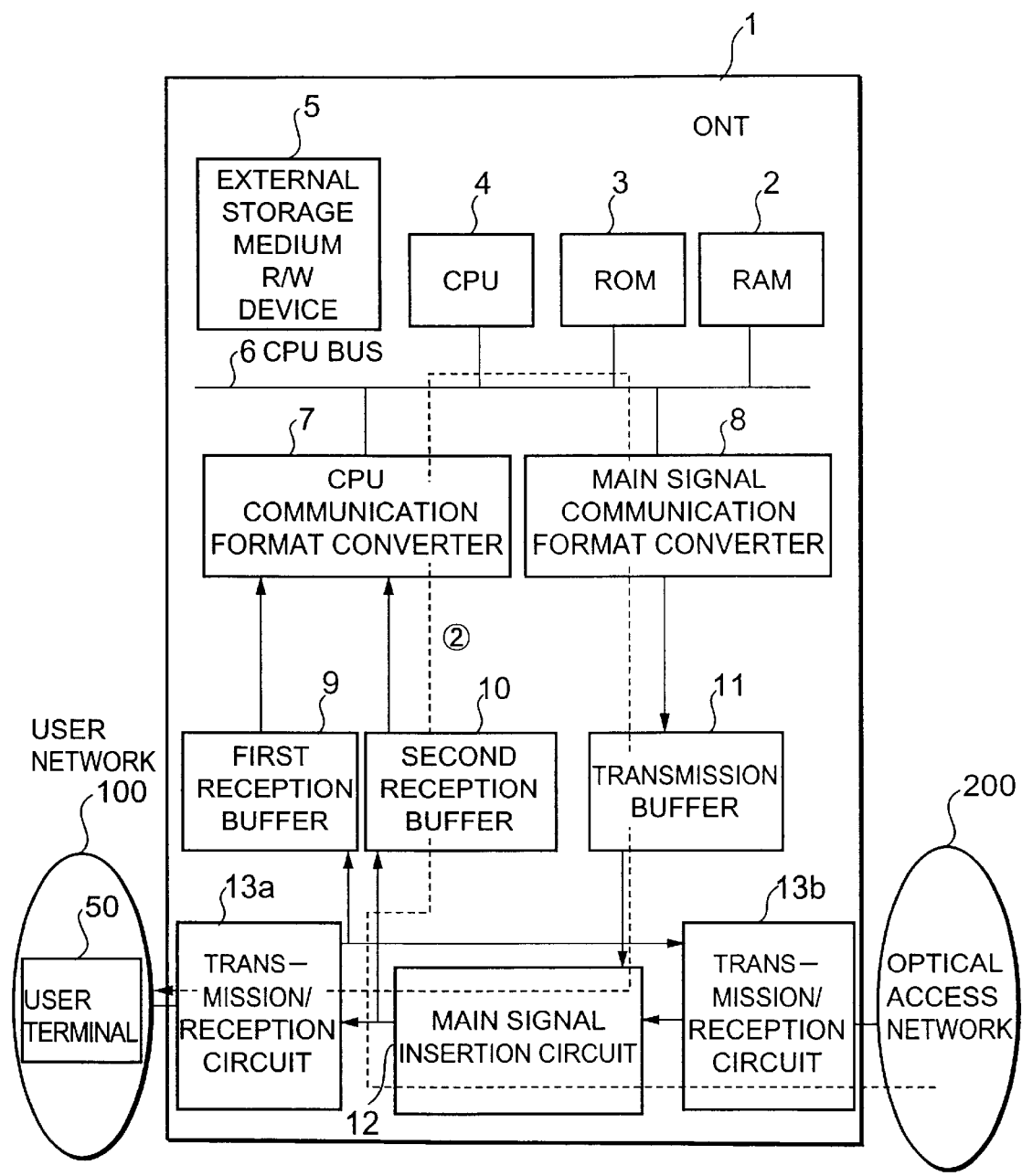
FIG. 6 is a block diagram showing a signal flow sent from optical access network of an optical network termination apparatus according to the first embodiment.

And another sample signal flow from the optical access network is shown in FIG. 6 with dotted line. This signal flow is used to require transmission for example.

Second Embodiment

Figure 3:
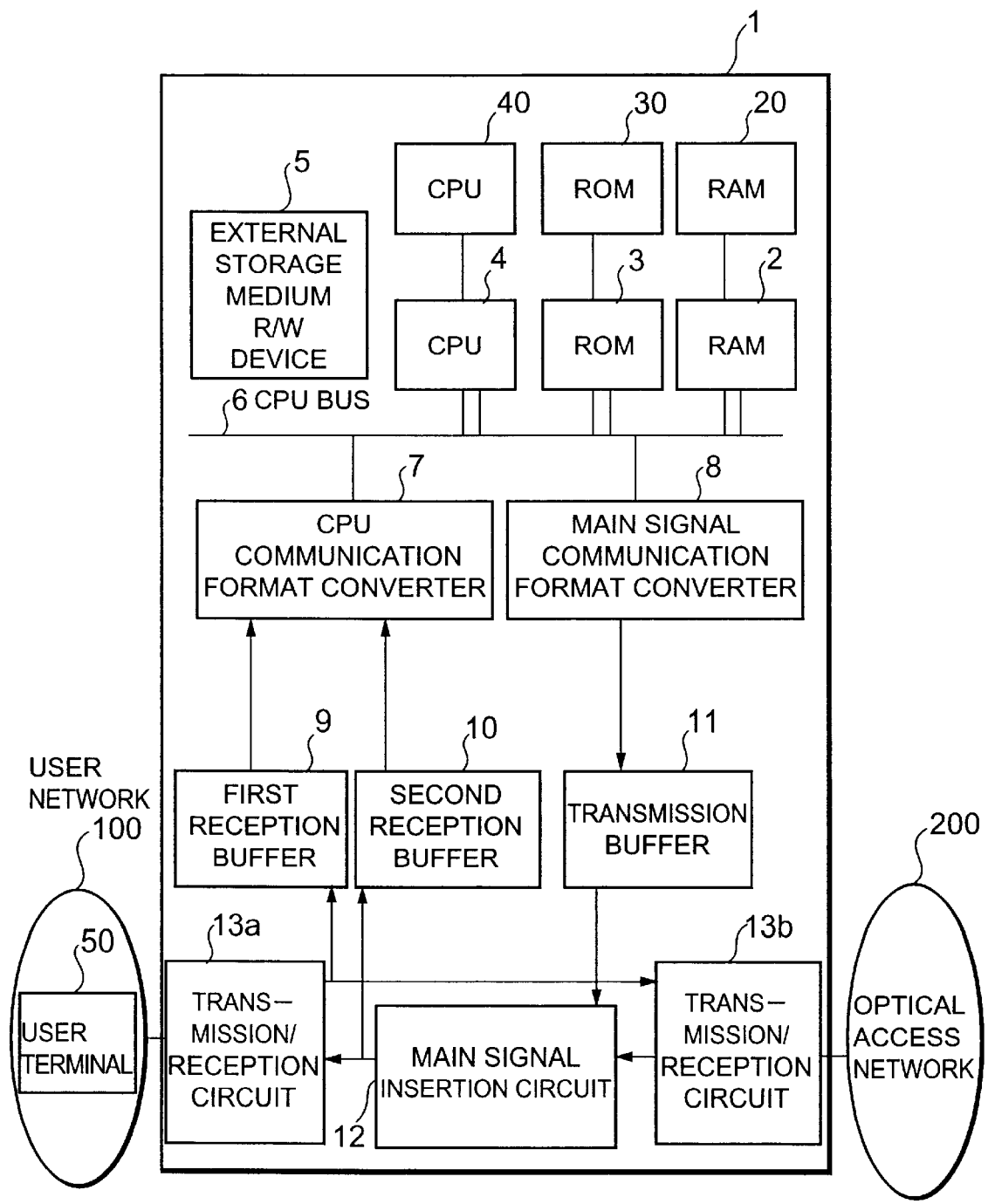
FIG. 3 is a block diagram showing principal elements of the optical network termination apparatus according to a second embodiment of the present invention.
Figure 4:
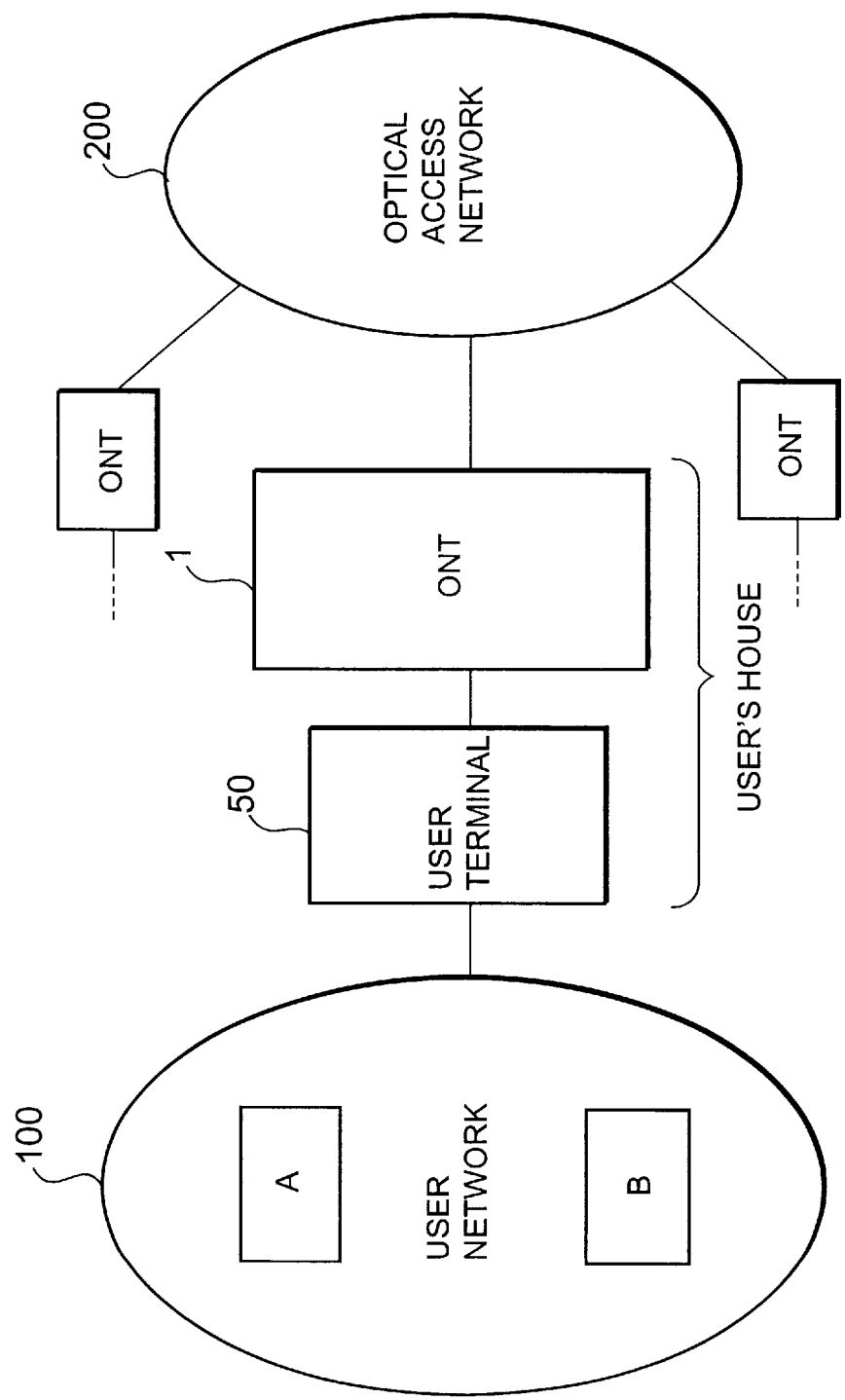
FIG. 4 is a block diagram showing the entire construction of the conventional optical access system.

Next, the optical network termination apparatus according to a second embodiment of the present invention will be described with reference to FIG. 3. FIG. 3 is a block diagram showing principal elements of the optical network termination apparatus according to the second embodiment of the present invention. In the above first embodiment, a CPU and a memory, which exist in the optical network termination apparatus for monitor-control on the overall optical network termination apparatus, are not described, however, in the second embodiment, the optical network termination apparatus has a CPU 40 for monitor control on the overall apparatus, a ROM 30 and a RAM 20 as memories, in addition to the CPU 4, the RAM 2 and the ROM 3.

As described above, according to the present invention, a user network and an optical access network can be connected to each other. By this arrangement, software installation from the user network and monitor control on the optical network termination apparatus from the user network can be realized. Further, overlapping services in the different two networks, e.g., to respond to an inquiry from the user network about information from the optical access network, can be provided. Further, a part of functions of the user terminal such as a personal computer connected to the user network can be performed by the optical network termination apparatus.

As many apparently widely different embodiments of the present invention can be made without departing from the spirit and scope thereof, it is to be understood that the invention is not limited to the specific embodiments thereof except as defined in the appended claims.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical network termination apparatus, comprising:

an optical-side transmission and reception circuit with connections for connection to an optical access network;

a user-side transmission and reception circuit with connections for two-way signal communications with a user network having a user terminal;

a main signal insertion circuit connected intermediate the optical-side transmission and reception circuit and the user-side transmission and reception circuit;

a first reception buffer connected to an output of the user-side transmission and reception circuit, the first reception buffer configured to buffer information, having a set address from the user network, via the user-side transmission and reception circuit and through the main signal insertion circuit, back into the user network;

a second reception buffer connected to said optical-side transmission and reception circuit, the second reception buffer configured to buffer information moving from the optical access network, via the optical-side transmission and reception circuit and through the main signal insertion circuit, into information having the set address to the user network;

a hardware CPU communication format converter connected to outputs of the first and second reception buffers;

a main signal communication format converter operatively connected to an output of the CPU communication format converter, an output of converter being operatively connected to an input of the main signal insertion circuit; and a storage medium device in communication with the CPU communication format converter and the main signal communication format converter, wherein, the signal communication format converter and the main signal communication format converter are configured to read an external storage medium, removably inserted in the storage medium device to obtain an address as the set address, a monitor signal with data received from the user network received at the user-side reception and transmission circuit is i) sent through the first reception buffer to the CPU communication format converter to hardware convert the monitor signal data to a CPU communication format with the set address, ii) the main signal communication format converter converts the converted monitor signal data to a main signal communication format and sends the monitor signal data converted to the main signal communication format to the main signal insertion circuit for iii) return, via the user-side reception and transmission circuit, to the user network, and a transmission signal with data received from the optical access network received at the optical-side reception and transmission circuit is i) sent through the main signal insertion circuit and the second reception buffer to the CPU communication format converter to convert the transmission signal data to the CPU communication format with the set address, ii) the main signal communication format converter converts the converted transmission signal data to the main signal communication format and sends the transmission signal data converted to the main signal communication format to the main signal insertion circuit for iii) return, via the user-side reception and transmission circuit, to the user network.

2. The apparatus of claim 1, wherein the storage medium device is a CD-ROM drive and the external storage medium is a CD-ROM.

3. The apparatus of claim 1, wherein the storage medium device is a floppy disk drive and the external storage medium is a floppy disk.

4. The apparatus of claim 1, wherein the storage medium device is a read and write device for reading and writing to the external storage medium.

5. The apparatus of claim 1, further comprising a transmission buffer connected intermediate the main signal communication format converter and the main signal insertion circuit.

6. The apparatus of claim 1, further comprising a CPU, a ROM, and a RAM connected to a CPU bus, and wherein the output of the main signal communication format converter is operatively connected to the input of the main signal insertion circuit via the CPU bus.

* * * * *